June 19, 1934.  P. D. HARTOG  1,963,843
COUPLING
Filed Sept. 11, 1931  2 Sheets-Sheet 1

Inventor
Paul D. Hartog

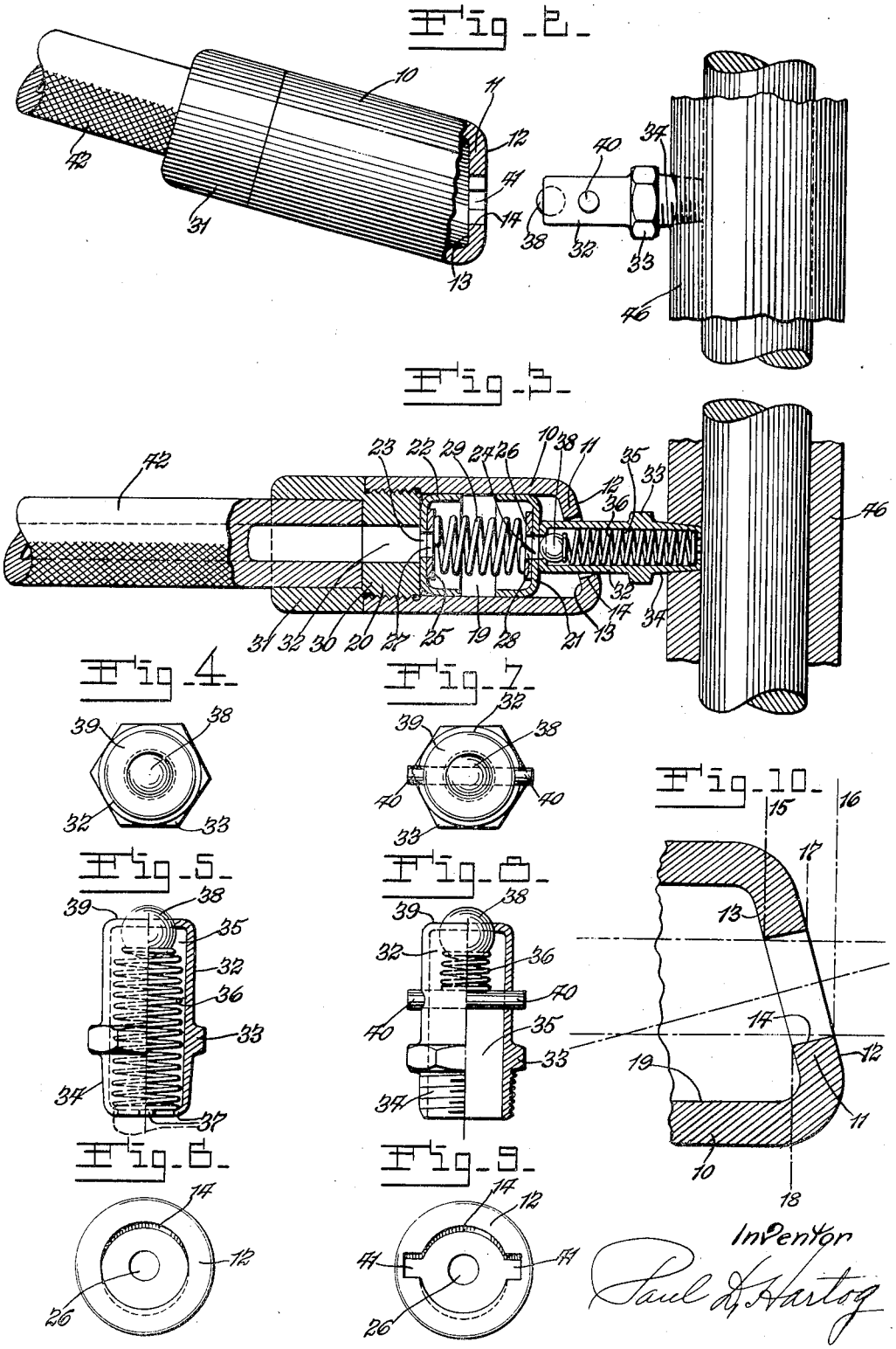

Patented June 19, 1934

1,963,843

UNITED STATES PATENT OFFICE 1,963,843

COUPLING

Paul D. Hartog, East Elmhurst, N. Y.

Application September 11, 1931, Serial No. 562,251

8 Claims. (Cl. 285—161)

This invention relates to improvements in couplings and is particularly concerned with improvements in couplings forming a part of a lubricating system comprising a plurality of coupling members denominated fittings which fittings are secured to bearings of machinery and the like requiring lubrication by means of a force pump having a lubricant conveying conduit upon the free end of which is provided a coupling member for making successive attachable and detachable connections with fittings. The objective provisions of this invention are:—

Firstly: To provide novel means for attaching and detaching a coupling member to a fitting.

Secondly: To provide a novel coupling member for attachable and detachable connections with member fittings by a simple angular movement.

Thirdly: To provide a novel coupling member adapted to grip the peripheral contour of a fitting, with or without pin, or moving parts which are subject to wear.

Fourthly: To provide a coupling member simple in construction, efficient in operation and economical in manufacture.

Further objects of this invention will become obvious as of the full, clear, concise, detailed description here given and which will also enable others skilled in the art to which this invention relates to understand, make and use the same when read in connection with the accompanying drawings, in which—

Fig. 2 is a side elevation, partly in section, of this improved coupling member and a bearing provided with a fitting.

Fig. 3 is a side elevation in section illustrating the coupling member engaged on a fitting secured to a bearing.

Fig. 4 is a plan view of the fitting member.

Fig. 5 is a view in elevation, partly in section, of the type of fitting shown in plan view Fig. 4.

Fig. 6 is an end view in elevation of the coupling member as employed on the fitting illustrated in views 4 and 5.

Fig. 7 is a plan view in elevation of a fitting on which this improved coupling member can be employed.

Fig. 8 is a side view in elevation, partly in section, of the fitting shown in plan view Fig. 7.

Fig. 9 is an end view of the coupling member as used on the fittings illustrated in views 7 and 8.

Fig. 10 is an enlarged fragmentary view in side elevation, partly in section, of the transverse end portion of this improved coupling member.

Figure 1:
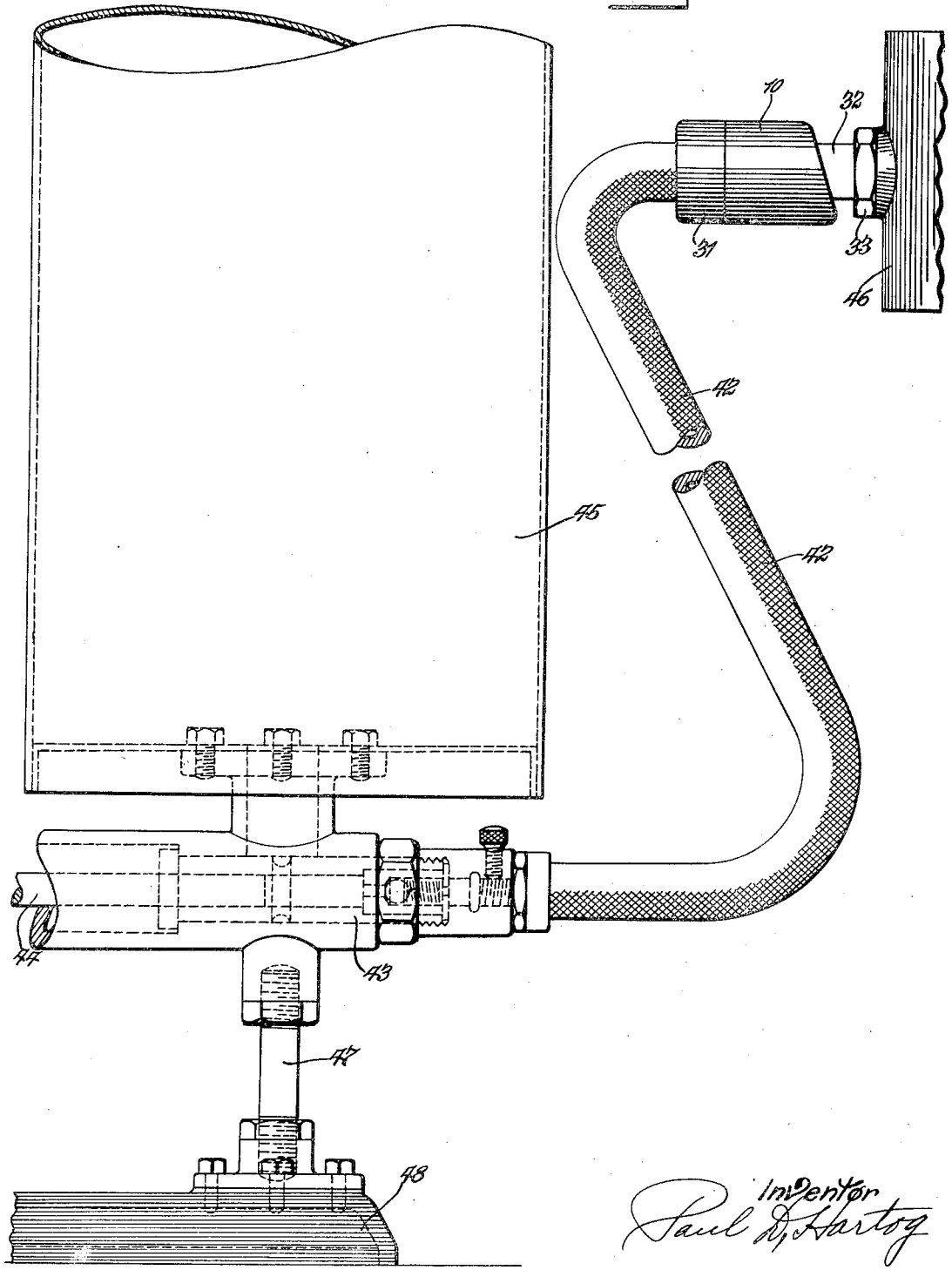
Fig. 1 is a side elevation illustrating this improved coupling member and fitting coupled in a practical operative arrangement with that of an end portion of a force pump.

The structural parts of this invention are designated numerically, understanding that like parts are designated by like numerals throughout the several views, in the order of which, with reference to the drawings, 10 designates that part of the coupling member denominated the body which is provided with a transverse end portion 11 having opposite side surfaces 12 and 13, which surfaces for the purpose of proper localization may be termed outer and inner surfaces. Within the transverse end portion 11 an aperture is provided whereby a surface 14 is formed surrounding the aperture. The surface 14, which surrounds the aperture, provides an interruption or rather terminates the area of the outer and inner surfaces 12 and 13 of the transverse end portion 11, whereby edges are formed on the outer and inner surfaces 12 and 13 with the surface 14 surrounding the aperture. This is due to the converging of the respective surfaces at a common point of limitation, illustration of which is shown at Fig. 10 of the drawings, wherein the converging or intersection of surfaces are indicated by numerals 15, 16, 17 and 18. The body 10 of this improved coupling member is also provided with an internal chamber or bore 19 in which fluid sealing members 21 and 22 are located having central port holes 23 and 24 and insofar as these members 21 and 22 are made from soft pliable material they necessarily require reinforcing means to prevent distortion and for that purpose steel discs 25 and 26 are used and arranged to bear against the inner surfaces of the respective members. The steel discs are provided with central port holes 27 and 28 which holes align with the holes 23 and 24 of the sealing members. The sealing member 21 is normally held pressed against the inner surface 13 of the transverse surface by the pressure spring 29, the reacting pressure of which presses the member 22 against the face of the portion 20. The ends of the spring 29 have a bearing against the face of the steel discs 25 and 26.

The internally threaded end of the body 10 is adapted to screw onto a threaded end 30 of a ferrule or sleeve 31 which is also provided with a port hole 32 which alines with the previously mentioned port holes. In the view Fig. 3, the coupling member is shown in coupled relation with that of a fitting member, which fitting is shown, secured to a bearing. The fitting shown is the component member serving to complete the coupling member. The fitting illustrated in the drawings in views 4 and 5 comprises a body 32 which is circular in form over the major portion of its circumferential contour, excepting a portion 33 which is hexagonal in form to provide a surface to which a wrench can be applied for the purpose of attaching the fitting to or detaching it from a bearing. The threaded end 34 of the fitting provides means for attachment. The internal portion of the fitting has a chamber or bore 35 and in which an extension pressure spring 36 is placed having a bearing at the lower end of the threaded portion 34 resting upon the inwardly flanged sections 37 of the end 34. The spring also has an opposite bearing on the lower surface of a ball 38 which is held in such a position that the major portion of the surface of the ball is within the chamber 35, the other portion projecting beyond the inwardly flanged rim 39. The rim 39 forms an opening and also a seat for the ball 38. The function of the ball is that of forming a seal within the rim 39 whereby the influx of foreign matter, such as dust, grit or dirt, is prevented from entering the chamber of the fitting member and thereby getting into harmful contact with the bearing.

In the drawings, Fig. 6 shows an end view of the coupling member provided with an aperture having the more preferable form and employed when the coupling member is used in connection with the type of fitting member shown in views 4 and 5. There is also illustrated in views 7 and 8 a type of fitting which is the same in construction as that of the fitting previously described with this exception, however, in that the fitting shown in views 7 and 8 has an additional provision of a pin 40 arranged in a transverse position through the body 32 of the fitting and which pin projects a limited distance beyond the periphery of the body 32, the spring 36 resting upon the top surface of the pin. When this type of fitting is used, in connection with this improved coupling member, a special provision is made, in the form of the aperture, in the transverse end portion 11, insofar as to provide openings 41 to admit the entrance of the projecting portions of the pin 40 into openings 41 of the coupling member. It is, however, to be understood that the pin 40 is not used in any way with this improved coupling member to connect onto the fitting.

The type of fitting shown in views 7 and 8 as herein referred to is for the purpose of indicating that this improved coupling member can be coupled with any type of fitting having a circular contour. Referring to Fig. 1 of the drawings, illustration is therein made of the practical application and connection of this improved coupling member and fitting member coupled together, illustrating the coupling member connected to a flexible conduit 42, the conduit 42, connected to the discharge end portion of a cylinder 43 of a force pump (a portion only of which is here shown) comprising a piston 44 operative within the cylinder 43. On the suction stroke of the piston, the fluid held in the container 45,— which container surmounts the cylinder 43,— is drawn into the cylinder and forced therefrom, at high pressure, through the conduit 42 passing through the coupling and into the bearing 46. The container 45 and cylinder 43, constituting the end portion of the force pump herein shown, is supported by a stud 47 upon a base frame 48.

Reference is now made to Fig. 2 of the drawings, wherein this improved coupling member is shown as of a position to be placed on the fitting 32, noting, that the coupling member is of a position at an angle with that of the lengthwise axis of the fitting 32, the reason for this is that the wall line plane surface surrounding the aperture 14 must be in the same plane of the peripheral contour of the fitting to which the coupling member is applied, in order that the coupling member may slip on the fitting freely when the projecting body of the fitting is inserted into the opening of the aperture 14.

When the coupling member is placed on the fitting member, it is then moved into such a position that the central lengthwise axis of the coupling member is in alinement with the central axis of the fitting member, and when so positioned the edges 15 and 16, of the transverse end portion 11 of the coupling member, are engaged upon the peripheral contour of the fitting member. A slight pressure by hand upon the coupling member in the same direction in which the coupling member was placed upon the fitting will cause the engaging edges 15 and 16,—clearly depicted in view 10 of the drawings—to grip the surface of the fitting sufficiently firm enough to withstand the pressure of the forced lubricant as administered by the force pump to the bearing, without disengaging the coupling member from the fitting member. Furthermore, and at the time the lubricating is taking place, provision is made to prevent leakage of the lubricant by the sealing member 21, the lubricant sealing face of which is illustrated as having the face thereof pressed against the rim face 39 of the fitting member and coincidentally the member 22 is illustrated with its face portion pressed against the face of the threaded end 30 of the ferrule 31 to prevent the lubricant from oozing through the threaded end. In order to detach the coupling member from the fitting member, it is only necessary to elevate the coupling member to the position at which it was placed upon the fitting and it will then slip from off the fitting member freely.

Having thus described this construction constituting this improved coupling as the invention of the signatory party hereto and recognizing that numerous and extensive departures may be made from the embodiments herein illustrated, described and referred to, but without departing from the scope of that which is desired to secure by Letters Patent of the United States of America, my invention, which I claim is:

1. A coupling member comprising a chambered body, a transverse end portion on said body, an aperture in said transverse end portion, edges surrounding said aperture and formed upon the surfaces of said transverse end portion, said edges adapted to provide gripping contact engaging means for said coupling member when force is applied to said member, and a fitting member for said coupling member.

2. A coupling member comprising a chambered body, a transverse end portion on said body having oppositely disposed surfaces thereon, an aperture in said transverse end portion, oppositely formed edges provided on said transverse end portion by means of the converging of the respective surfaces thereof, said edges adapted to grip in relatively opposite direction upon the contour of a member with which said coupling member is in mutual engagement, and a fitting member for said coupling member.

3. A coupling member comprising a chambered body, a transverse end portion on said body, said transverse end portion having oppositely disposed surfaces thereon, an aperture in said transverse end portion, a surface surrounding said aperture and converging in edges with the oppositely disposed surfaces on said transverse end portion, whereby oppositely disposed gripping edges are formed upon the respective surfaces of the transverse end portion of said coupling member, and a fitting member adapted to be gripped by said coupling member in mutual contact engagement and operatively attachable and detachable, one member with that of the other.

4. In a coupling adapted for lubricating purposes comprising a lubricant receiving tubular member, means on said member and at one end thereof adapted for connecting said member to a bearing, aperture sealing means at the opposite end of said member forming a closure, of a lubricant dispensing coupling member comprising a chambered body, an end portion on said body, an aperture in said end portion, said end portion provided with edges, said edges adapted to form a gripping contact engagement upon the contour of said lubricant receiving member, and means for forcing lubricating material through said mutually engaged coupling.

5. In a coupling of the class described, a chambered lubricant-discharging body having a bore, a piston member slidably fitted therein, said member having an opening, the body having an outer end formed at an acute angle to the axis of the body, the outer end having an aperture at an angle to the axis of the body, the aperture being adapted to receive a cylindrical fitting member of smaller diameter than the aperture and having an orifice in its end, whereby when the fitting member is inserted and the body canted until the axis of the fitting member is substantially coincident with the axis of the body, the fitting member will be gripped by the edges of the aperture and the orifice will be in registration with the opening.

6. In a coupling of the class described, a chambered lubricant-discharging body having a bore, a piston member slidably fitted therein, said member having an opening, the body having an outer end formed at an acute angle to the axis of the body, the outer end having an aperture at an angle to the axis of the body, the aperture being adapted to receive a cylindrical fitting member of smaller diameter than the aperture and having an orifice in its end, yieldable means for forcing the piston member toward the aperture, whereby when the fitting member is inserted and the body canted until the axis of the fitting member is substantially coincident with the axis of the body, the fitting member will be gripped by the edges of the aperture and the orifice will be in registration with the opening.

7. A coupling for use with a nipple, comprising a chambered lubricant-discharging body having an aperture for accommodating an end portion of the nipple, the aperture having an axis situated at an angle to the longitudinal axis of the coupling, the wall of the aperture having edges providing means for gripping the nipple when the nipple is inserted therein and canted into substantial alignment with the axis of the coupling.

8. In a coupling of the class described, a chambered lubricant-discharging body having a bore, a piston member slidably fitted therein, said member having an opening, the outer end of the body having an aperture at an angle to the axis of the body, the aperture being adapted to receive a cylindrical fitting member of smaller diameter than the aperture and having an orifice in its end, whereby when the fitting member is inserted and the body canted until the axis of the fitting member is substantially coincident with the axis of the body the fitting member will be gripped by the edges of the aperture and the orifice will be in registration with the opening.

PAUL D. HARTOG.